(12) United States Patent
Matsui

(10) Patent No.: US 12,093,580 B2
(45) Date of Patent: Sep. 17, 2024

(54) INFORMATION PROCESSING APPARATUS AND NON-TRANSITORY COMPUTER READABLE MEDIUM FOR DISPLAYING WORKFLOW OF PROCESSING UNIT

(71) Applicant: FUJIFILM Business Innovation Corp., Tokyo (JP)

(72) Inventor: Takao Matsui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 551 days.

(21) Appl. No.: 17/314,062

(22) Filed: May 7, 2021

(65) Prior Publication Data

US 2022/0156018 A1     May 19, 2022

(30) Foreign Application Priority Data

Nov. 19, 2020   (JP) .................................. 2020-192208

(51) Int. Cl.
    *G06F 3/12*     (2006.01)
(52) U.S. Cl.
    CPC .......... *G06F 3/1207* (2013.01); *G06F 3/1275* (2013.01)
(58) Field of Classification Search
    None
    See application file for complete search history.

(56) References Cited

U.S. PATENT DOCUMENTS

| | | | |
|---|---|---|---|
| 2006/0034630 A1* | 2/2006 | Yabe | G03G 15/50 399/82 |
| 2006/0044612 A1* | 3/2006 | Kayama | G06F 3/1288 358/1.15 |
| 2010/0245899 A1* | 9/2010 | Hirama | G06F 3/1284 358/1.15 |
| 2018/0335982 A1* | 11/2018 | Kotaka | G06F 3/1262 |
| 2019/0369932 A1* | 12/2019 | Yamasaki | G06F 3/1207 |

FOREIGN PATENT DOCUMENTS

JP     2019-211999     12/2019

* cited by examiner

*Primary Examiner* — Akwasi M Sarpong
*Assistant Examiner* — Pawan Dhingra
(74) *Attorney, Agent, or Firm* — JCIPRNET

(57) ABSTRACT

An information processing apparatus includes a processor configured to acquire information indicating one or more components constituting a processing unit to be processed in each of steps within a workflow, and to execute first display control. The information is acquired for each step. The first display control involves displaying a processing-unit image in a display region corresponding to a first step within the workflow in a case where at least one of one or more components constituting a processing unit to be processed in the first step is in the first step. The processing-unit image indicates the processing unit to be processed in the first step. The display region is provided within a screen indicating progress of the workflow. The one or more components constituting the processing unit to be processed in the first step are identified based on the information.

13 Claims, 19 Drawing Sheets

FIG. 10

| ORDER ID | ORDER NAME | ORDER RECEIVED TIME | CLIENT NAME | CLIENT ID | ... |
|---|---|---|---|---|---|
| 1000001 | GIFT CATALOG SET | 8/20/2020 13:10 | A | 100 | ... |

FIG. 11

| PRODUCT ID | ORDER ID | PRODUCT NAME | NUMBER OF COPIES | .... |
|---|---|---|---|---|
| 2000001 | 1000001 | GIFT CATALOG A | 100 | |
| 2000002 | 1000001 | GIFT CATALOG B | 100 | |

FIG. 12

| COMPONENT ID | PRODUCT ID | GROUP ID | COMPONENT NAME | SHEET ID | .... |
|---|---|---|---|---|---|
| 3000001 | 2000001 | 1 | FRONT COVER | 1 | |
| 3000002 | 2000001 | 2 | BODY TEXT | 2 | |
| 3000003 | 2000001 | 3 | APPLICATION POSTCARD | 3 | |
| 3000004 | 2000002 | 1 | FRONT COVER | 1 | |
| 3000005 | 2000002 | 2 | BODY TEXT | 2 | |
| 3000006 | 2000002 | 3 | APPLICATION POSTCARD | 3 | |

FIG. 13

| SHIPPING ID | ORDER ID | PRODUCT ID | DEADLINE | NUMBER OF COPIES | SHIPPING DESTINATION | . . . . |
|---|---|---|---|---|---|---|
| 4000001 | 1000001 | 2000001 | 9/1/2020 | 50 | TOKYO | |
| 4000001 | 1000001 | 2000002 | 9/5/2020 | 50 | TOKYO | |
| 4000002 | 1000001 | 2000001 | 9/1/2020 | 50 | OSAKA | |
| 4000002 | 1000001 | 2000002 | 9/5/2020 | 50 | OSAKA | |

FIG. 14

| COMPONENT ID | PRODUCT ID | GROUP ID | SHIPPING ID | ORDERING | CREATING | PREPRESSING | PRINTING | PROCESSING | INSPECTION | SHIPPING |
|---|---|---|---|---|---|---|---|---|---|---|
| 3000001 | 2000001 | 1 | 4000001 | COMPLETED | COMPLETED | WAITING | | | | |
| 3000002 | 2000001 | 2 | 4000001 | COMPLETED | COMPLETED | WAITING | | | | |
| 3000003 | 2000001 | 3 | 4000001 | COMPLETED | WAITING | | | | | |
| 3000004 | 2000002 | 1 | 4000002 | COMPLETED | COMPLETED | WAITING | | | | |
| 3000005 | 2000002 | 2 | 4000002 | COMPLETED | COMPLETED | WAITING | | | | |
| 3000006 | 2000002 | 3 | 4000002 | COMPLETED | COMPLETED | WAITING | | | | |

FIG. 15

| COMPONENT ID | PRODUCT ID | GROUP ID | SHIPPING ID | ORDERING | CREATING | PREPRESSING | PRINTING | PROCESSING | INSPECTION | SHIPPING |
|---|---|---|---|---|---|---|---|---|---|---|
| 3000001 | 2000001 | 1 | 4000001 | COMPLETED | COMPLETED | COMPLETED | COMPLETED | COMPLETED | COMPLETED | WAITING |
| 3000002 | 2000001 | 2 | 4000001 | COMPLETED | COMPLETED | COMPLETED | COMPLETED | COMPLETED | COMPLETED | WAITING |
| 3000003 | 2000001 | 3 | 4000001 | COMPLETED | COMPLETED | COMPLETED | COMPLETED | COMPLETED | COMPLETED | WAITING |
| 3000004 | 2000002 | 1 | 4000002 | COMPLETED | COMPLETED | COMPLETED | COMPLETED | WAITING | | WAITING |
| 3000005 | 2000002 | 2 | 4000002 | COMPLETED | COMPLETED | COMPLETED | COMPLETED | WAITING | | |
| 3000006 | 2000002 | 4 | 4000002 | COMPLETED | COMPLETED | COMPLETED | IN PROGRESS | | | WAITING |

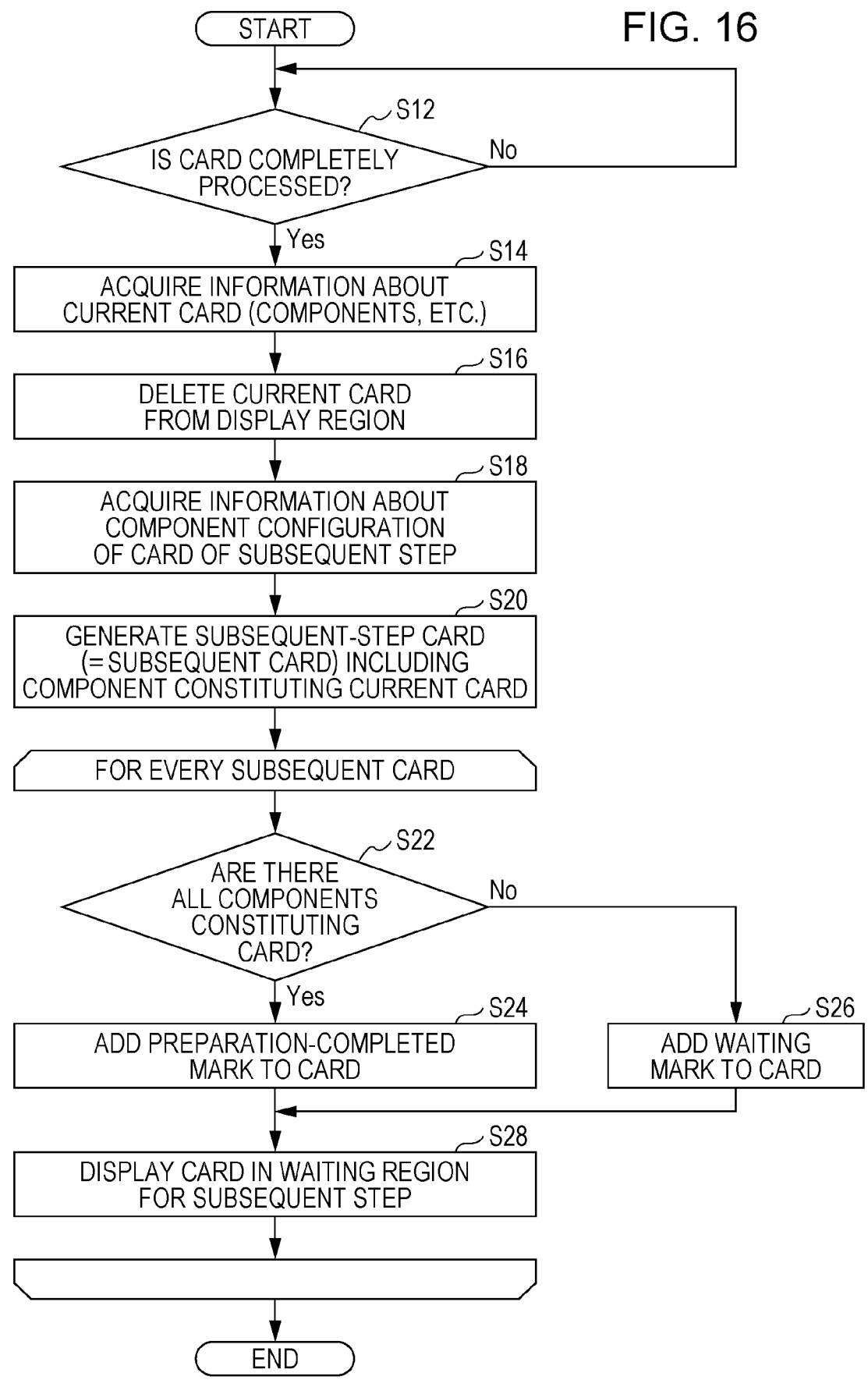

INFORMATION PROCESSING APPARATUS AND NON-TRANSITORY COMPUTER READABLE MEDIUM FOR DISPLAYING WORKFLOW OF PROCESSING UNIT

CROSS-REFERENCE TO RELATED APPLICATIONS

This application is based on and claims priority under 35 USC 119 from Japanese Patent Application No. 2020-192208 filed Nov. 19, 2020.

BACKGROUND

(i) Technical Field

The present disclosure relates to information processing apparatuses and non-transitory computer readable media.

(ii) Related Art

Japanese Unexamined Patent Application Publication No. 2019-211999 discloses a printing management system for monitoring the progress of a group job containing multiple different print jobs from multiple points of view, including units of orders, groups, and components. The printing management system includes an acquiring unit that acquires print information of printed products each constituted of multiple printed components and adds a product identifier to each printed product, a splitting unit that splits the print information into component print information for each printed component and adds a component identifier to each split piece of component print information, a generating unit that generates group print information grouping together the multiple pieces of component print information in accordance with component print attributes included in the component print information and adds a group identifier to each generated piece of group print information, and an identifier management unit that performs management by linking the product identifier related to one printed product with the component identifier related to the printed component constituting the printed product and also with the group identifier related to the group print information containing the component print information of the printed component.

There is also a mechanism that makes the workflow progress viewable by transferring a card in accordance with the progress of the workflow. This is achieved by preparing a progress display board having regions for the steps of the workflow arranged in the sequence of the steps, and transferring the card to the region for the subsequent step every time one step is completed. A person in charge of the step in which the card is located executes the work involved in the step with respect to a processing unit indicated by the card. There is also a system that applies such a progress display method in the form of software.

SUMMARY

The combination of components constituting a processing unit to be processed in each step of the workflow may vary from step to step.

The following is a conceivable example of a workflow for concurrently manufacturing multiple types of catalogs each constituted of three types of components, namely, a front cover, body text, and an application postcard. In a designing step, the individual components, such as the front cover and the body text, constituting each catalog serve as processing units, and the individual processing units, that is, the components, are each assigned to and processed by a person in charge of design. In a printing step, the front cover that uses the same type of sheet serves as a single processing unit for multiple types of catalogs from the standpoint of, for example, improved working efficiency. Likewise, each of the body text and the application postcard also serves as a single processing unit for multiple types of catalogs, and each processing unit is assigned to a person in charge of operation of a printer that uses the type of sheet corresponding to the processing unit. In a processing step, such as a bookbinding step, the individual types of catalogs each serve as a single processing unit.

In contrast, the method that involves transferring a card in accordance with the progress of the workflow is based on an assumption that the same processing target indicated by the card sequentially undergoes the steps. Therefore, this method is not directly applicable to a system in which a processing unit varies from step to step.

Aspects of non-limiting embodiments of the present disclosure relate to an apparatus that may display a processing unit to be processed in each step in a workflow even in a case where a processing unit may vary from step to step.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to acquire information indicating one or more components constituting a processing unit to be processed in each of steps within a workflow, and to execute first display control. The information is acquired for each step. The first display control involves displaying a processing-unit image in a display region corresponding to a first step within the workflow in a case where at least one of one or more components constituting a processing unit to be processed in the first step is in the first step. The processing-unit image indicates the processing unit to be processed in the first step. The display region is provided within a screen indicating progress of the workflow. The one or more components constituting the processing unit to be processed in the first step are identified based on the information.

BRIEF DESCRIPTION OF THE DRAWINGS

An exemplary embodiment of the present disclosure will be described in detail based on the following figures, wherein:

FIG. 10 illustrates the contents of order management information;

FIG. 11 illustrates the contents of product management information;

FIG. 12 illustrates the contents of component management information;

FIG. 13 illustrates the contents of shipping management information;

FIG. 14 illustrates the contents of progress management information at a certain time point;

FIG. 15 illustrates the contents of progress management information at another time point;

FIG. 16 illustrates a procedure for updating the progress screen when a certain card is completely processed in a certain step;

DETAILED DESCRIPTION

An information processing apparatus according to an exemplary embodiment of the disclosure will be described below with reference to the drawings. The information processing apparatus according to this exemplary embodiment generates a progress screen 1000 showing the progress of a workflow.

Figure 1:
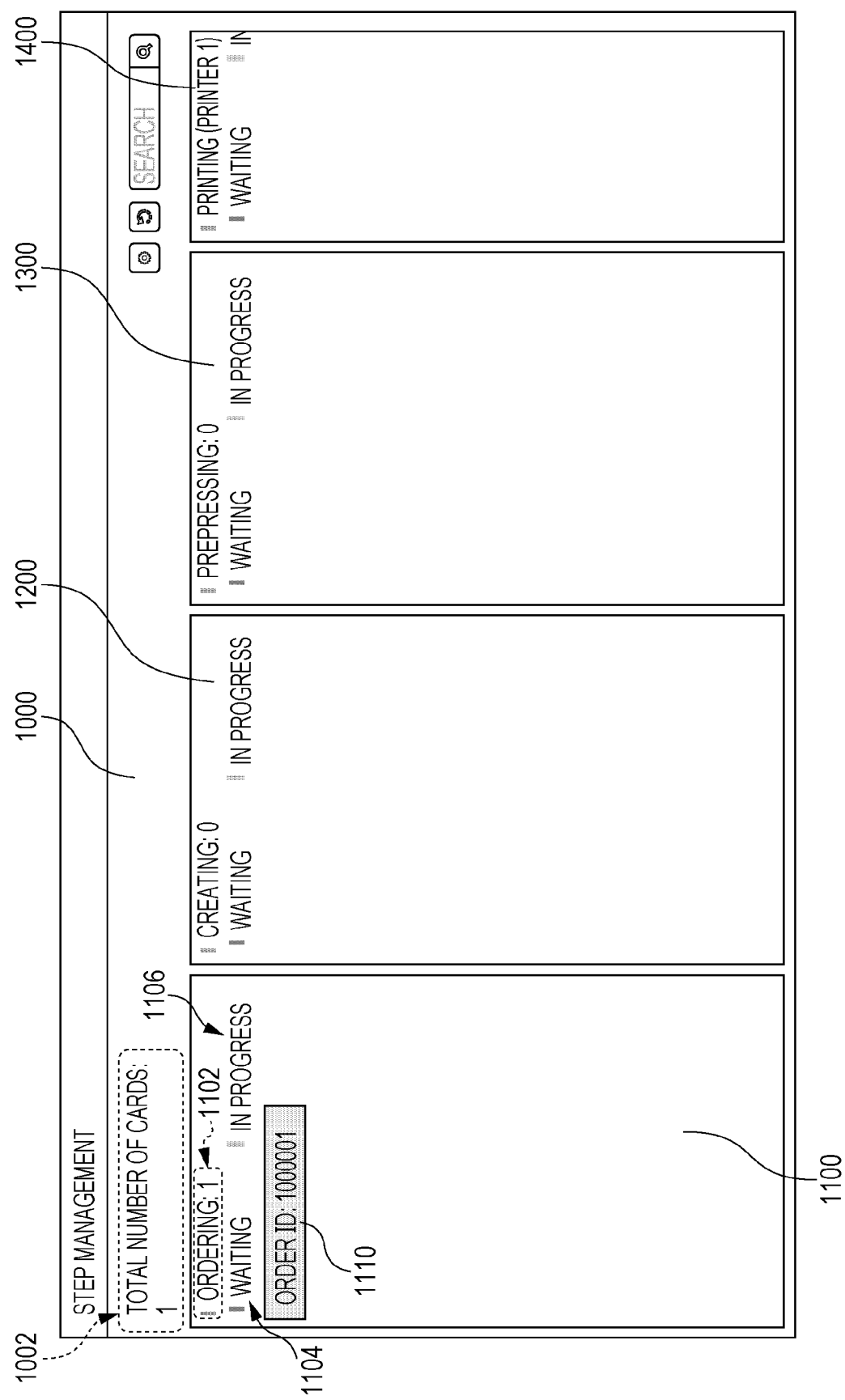
FIG. 1 illustrates an example of a progress screen provided by an information processing apparatus and showing the progress of a workflow.

FIG. 1 illustrates an example of the progress screen 1000. The progress screen 1000 is provided with display regions 1100, 1200, 1300, 1400, and so on (collectively referred to as "display region 1100 and so on" hereinafter) for respective steps in the workflow.

The example of the progress screen 1000 shown in FIG. 1 and so on is oriented toward workflow management of commercial printing. A commercial printing workflow includes, for example, an ordering step, a creating step, a prepressing step, a printing step, an inspection step, and a shipping step. The steps have a predetermined sequence set therefor within the workflow and proceed from the left side toward the right side of the progress screen 1000 in the following order: the ordering step, the creating step, the prepressing step, the printing step, a processing step (such as a bookbinding step), the inspection step, and the shipping step. With regard to the printing step in each of the drawings, the display region 1400 is provided for each printer to be used such that the usage status of the printer is ascertainable.

The progress screen 1000 is a user interface of a type that displays a process to be performed in each step in a card format. The display region 1100 and so on for the respective steps each display a card 1110 therein that indicates a processing unit. A processing unit is a target to be processed in that step and is constituted of at least one component. A component is an element as a minimum unit constituting a processing unit. A card, such as the card 1110, displayed within the display region 1100 is an example of a processing-unit image indicating a processing unit.

The card 1110 displays information to be used for identifying the card 1110. In the example in FIG. 1, the card 1110 displays therein a text string "ORDER ID: 1000001" as specific information to be used for identifying the card 1110. In the text string, "ORDER ID" indicates that the card 1110 denotes the processing unit of the ordering step, and that the value "1000001" following the delimiter ":" denotes an ID, that is, identification information, of the processing unit of the ordering step. The specific information displayed on the card 1110 is not limited to that shown in the drawings so long as the processing unit is identifiable.

In order to minimize complexity in the following description, a processing unit and a card indicating the processing unit may both be referred to as "card" to an extent that it does not create confusion. For example, a component included in the processing unit indicated by the card 1110 within the display region 1100 may be referred to as a "component included in the card 1110".

The display region 1100 for the ordering step includes a title field 1102. The title field 1102 displays the name "ORDER" of the step and the number of cards (i.e., the number of processing units) currently located in the step. In the example in FIG. 1, the ordering step has only one card 1110, so that the number of cards displayed in the title field 1102 is 1. On the other hand, since there are no cards in other steps in the example in FIG. 1, the value of the number of cards in the title fields is 0.

Likewise, each of the display regions 1200, 1300, and so on for the other steps is provided with a title field displaying the name of the corresponding step and the number of cards.

Furthermore, the progress screen 1000 is provided with a number-of-cards field 1002. The number-of-cards field 1002 displays the total number of cards in the display regions 1100, 1200, 1300, and so on for the respective steps within the progress screen 1000

The display region 1100 for the ordering step is divided into a waiting region 1104 and an in-progress region 1106. The waiting region 1104 displays a card 1110 waiting for the ordering step. The in-progress region 1106 displays a card 1110 currently undergoing the ordering step.

Figure 2:
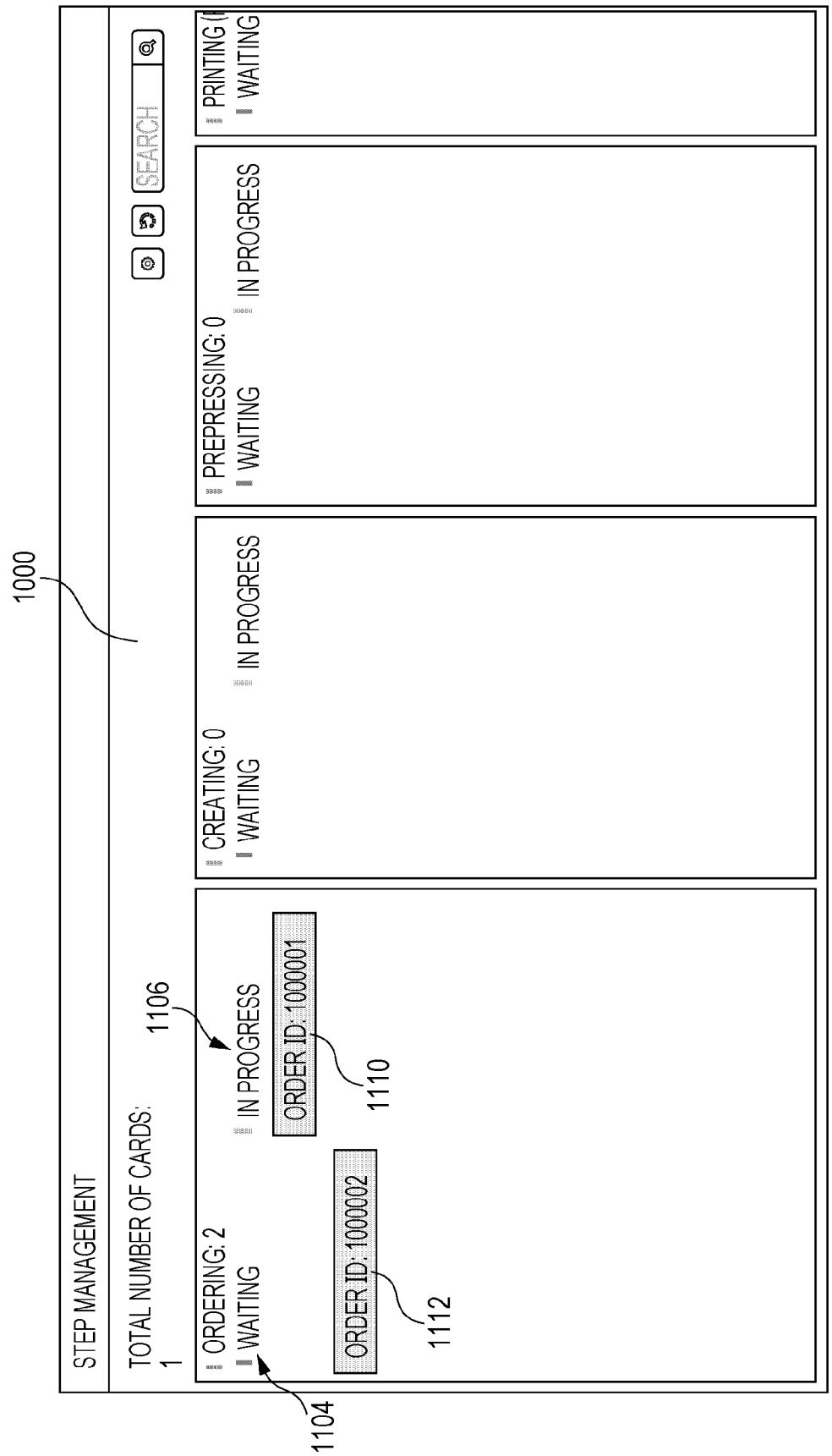
FIG. 2 illustrates another example of the progress screen showing the progress.

A card 1110 is first displayed in the waiting region 1104 within the display region 1100 for the ordering step (see FIG. 1). Subsequently, when all components of the card 1110 reach the ordering step and the ordering step commences for that card 1110, the card 1110 is displayed in the in-progress region 1106 (see FIG. 2). In the example shown in FIG. 2, a new order "ORDER ID: 1000002" arrives, and a card 1112 indicating this new order is displayed in the waiting region 1104.

Likewise, each of the display regions 1200, 1300, and so on for the remaining steps is divided into a waiting region and an in-progress region. A card in the waiting region for a certain step is not transferrable to the in-progress region until all components constituting the card (i.e., processing unit) reach the step. When a component is in a certain step (referred to as "first step") or in a step subsequent to the first step in the workflow, the component is expressed as having reached the first step. The expression "component is in a first step" indicates that a processing unit of the first step and including the component is waiting to be processed in the first step after undergoing a step immediately preceding the first step, or is currently undergoing the first step. If a component is in a step preceding the first step, the component is expressed as not having reached the first step.

When all the components constituting the card in the waiting region are in the certain step, the card becomes transferrable to the in-progress region. In one example, a certain person in charge of the step transfers the card to the in-progress region and starts the execution of the step. Alternatively, when a person in charge of the card with all the components set in the step is determined and the person in charge starts the process for that card, the information processing apparatus detects the situation and transfers the card from the waiting region to the in-progress region.

The information processing apparatus has a function for displaying the component configuration of the processing unit indicated in the card 1110 in response to a specific operation performed on the card 1110 by a user. Examples of such a specific operation include a so-called hover operation for positioning the pointer of a mouse above the card 1110 and an operation for clicking on the card 1110. In a case where the progress screen 1000 is displayed on a touchscreen, the specific operation may involve performing a predetermined touch gesture (such as single tapping) on the card 1110 in the progress screen 1000.

Figure 3:
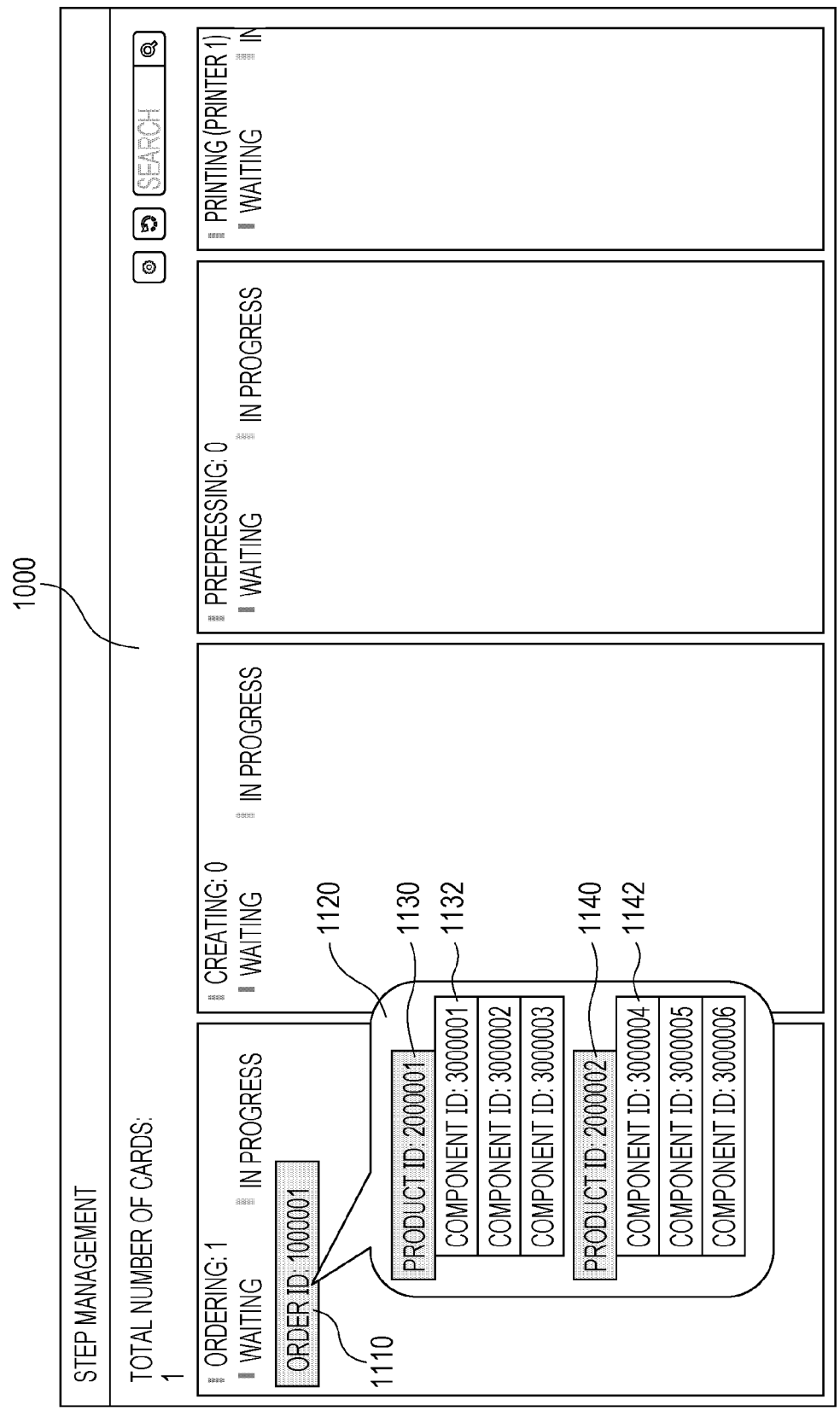
FIG. 3 illustrates another example of the progress screen showing the progress.

FIG. 3 illustrates a display example of the component configuration of the card 1110. In this example, a tool tip 1120 displayed in response to a hover operation performed on the card 1110 displays the component configuration of the card 1110. In this example, the tool tip 1120 displays icons 1130 and 1140 respectively indicating two products with product IDs "2000001" and "2000002". Icons 1132 indicating three components with component IDs "3000001", "3000002", and "3000003" are disposed below the product icon 1130 at positions displaced rightward by one level from the icon 1130. This positional relationship expresses that the processing unit indicated by the icon 1130 is constituted of the components indicated by the three icons 1132. Likewise, icons 1142 indicating three components with component IDs "3000004", "3000005", and "3000006" are disposed below the product icon 1140. In this example, the products indicated by the icons 1130 and 1140 are catalogs that are different from each other. Each of the components "3000001" and "3000004" is the front cover of the corresponding catalog, each of the components "3000002" and "3000005" is the body text of the corresponding catalog, and each of the components "3000003" and "3000006" is an application postcard (simply referred to as "postcard" hereinafter) bound in the corresponding catalog. Accordingly, in this example, creating and printing of two types of catalogs each constituted of three types of components, namely, the front cover, the body text, and the postcard, are received as one order.

Accordingly, in the example in FIG. 3, the order "1000001" as a processing unit is constituted of six components "3000001", "3000002", . . . , and "3000006". Moreover, intermediate-level structures as products constituted of multiple components exist between the processing unit serving as an order and the individual components.

The tool tip 1120 expresses a correspondence relationship between the products and the components in accordance with the positional relationship between the product icons 1130 and 1140 and the component icons 1132 and 1142. This mode for expressing the correspondence relationship between the products and the components in the tool tip 1120 is merely an example, and a different expression mode may be employed.

The icons 1132 and 1142 indicating the components and the icons 1130 and 1140 indicating the products as the intermediate-level structures including these components may be differentiated from each other based on different display modes, such as different display colors or different display densities.

A combination of components constituting a processing unit is individually set for each step. For example, the processing unit of the ordering step is an order constituted of the two products each including the three components shown in FIG. 3. Since the ordering step involves performing other processes for each order, such as registration of data related to the order, an order is set as a processing unit.

In contrast, the creating step subsequent to the ordering step has the individual components as processing units. Since the creating step involves designing the individual components, such as the front cover, the body text, and the postcard, components are set as processing units.

Figure 4:
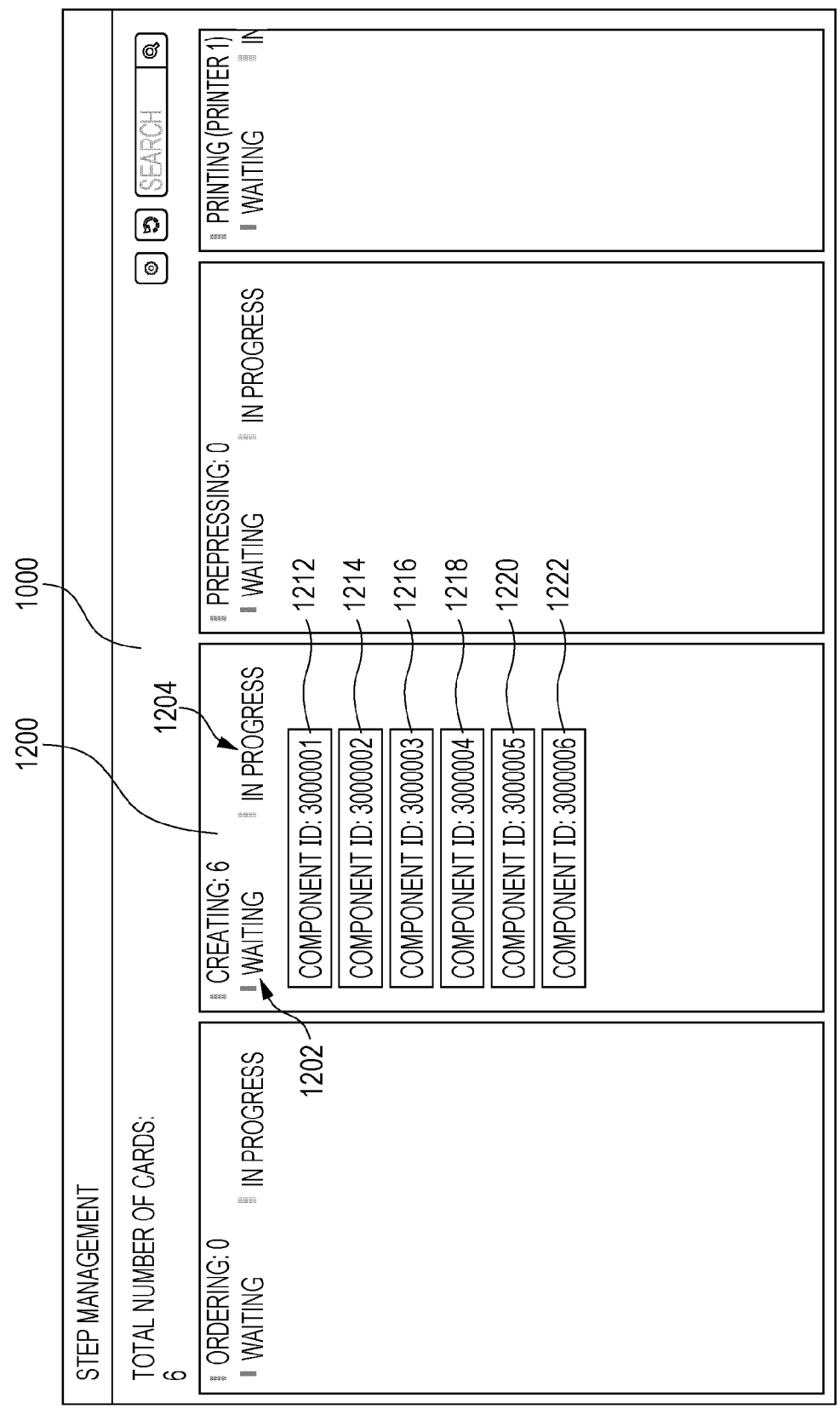
FIG. 4 illustrates another example of the progress screen showing the progress.

In each of the display region 1100 and so on for the respective steps, the information processing apparatus displays a card or cards indicating a processing unit or units in the relevant step. Therefore, for example, when the ordering step with respect to the card 1110 for a certain order shown in FIG. 1 is completed and the order is transferred to the subsequent creating step, the display region 1200 for the creating step does not display the card 1110 indicating the order, but displays cards 1212, 1214, 1216, 1218, 1220, and 1222 indicating the individual components, as shown in FIG. 4. Because the card 1110 includes six components, the display region 1200 displays six cards.

A designer viewing the progress screen 1000 in the state shown in FIG. 4 recognizes that the six components are in a waiting region 1202, and selects one component, such as the card 1212, therefrom so as to input an indication that the designer is to be in charge of creating the component to the information processing apparatus (or a workflow management system). In response to this input, the information processing apparatus transfers the card 1212 to an in-progress region 1204. Alternatively, the designer logged into the information processing apparatus may transfer the card 1212 located in the waiting region 1202 to the in-progress region 1204 by performing an operation, such as a drag-and-drop operation, so as to inform the information processing apparatus that the designer is to be in charge of creating the component indicated by the card 1212.

Accordingly, the information processing apparatus may transfer a card within the progress screen 1000 in response to an explicit card transferring operation, such as a mouse operation, or by detecting an event acting as a trigger for transferring the card instead of such a transferring operation. Examples of such an event include an input of the aforementioned designer's indication to be in charge of the processing of the card 1212 to the information processing apparatus and detection of completion of the step (such as printing by a printer) by using a sensor. Although transferring of a card from a waiting region to an in-progress region has been described above, transferring of a card between steps is similarly performed by the information processing apparatus in response to an explicit card transferring operation by the user or in response to other trigger events.

In each of the prepressing step and the printing step, a processing unit is a group for each component type. Specifically, in this example, in each of the prepressing step and the printing step, components of the same type in products included in an order are bundled into a single group, and the group is processed as a processing unit. In the example of the order for creating and printing two catalogs described above as a specific example, a group constituted of the front covers of the two catalogs, a group constituted of the body text of the two catalogs, and a group constituted of the postcards of the two catalogs serve as processing units in each of the prepressing step and the printing step. The reason for setting a group for each component type as a processing unit is that resources, such as sheets and printers, suitable for printing vary from component type to component type. The prepressing step is a step for preparing for the printing step and involves performing a process in processing units identical to those in the printing step. By bundling components of the same type in multiple products into a single group and processing the group, the processing efficiency may be improved, as compared with a case where processes are performed individually for individual components of individual products.

Figure 5:
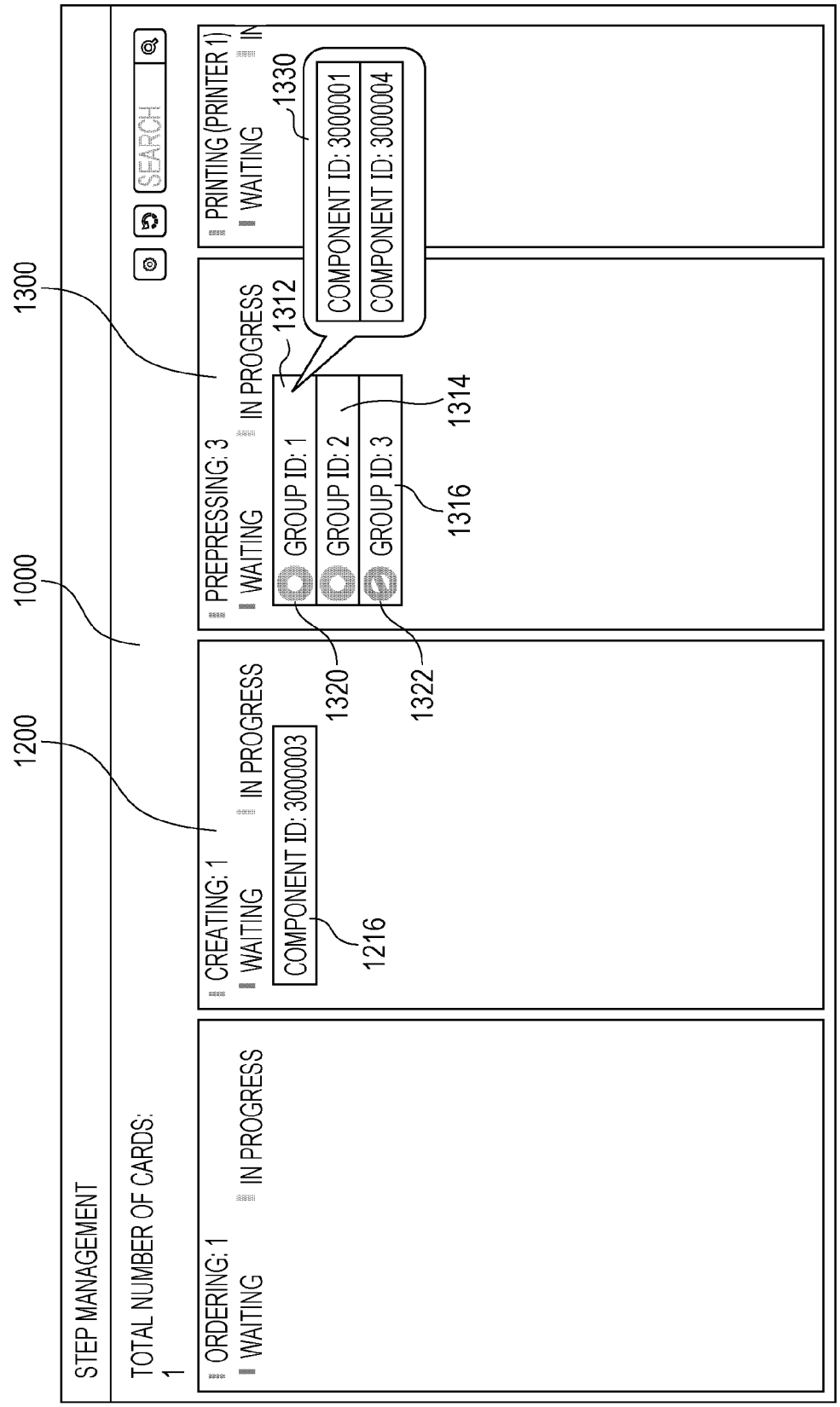
FIG. 5 illustrates another example of the progress screen showing the progress.

FIG. 5 illustrates an example of the progress screen 1000 when five of the six components in the creating step shown in FIG. 4 have completely undergone the creating step such that one component indicated by the card 1216 remains, and the five components are transferred to the subsequent prepressing step. In the progress screen 1000 in FIG. 5, cards 1312, 1314, and 1316 respectively indicating three groups with group IDs "1", "2", and "3" are displayed in the display region 1300 for the prepressing step. The card 1312 is a group constituted of front-cover components as the component type. The card 1314 is a group constituted of body-text components as the component type. The card 1316 is a group constituted of postcard components as the component type.

At the right side of each of the cards 1312 and 1314, a preparation-completed mark 1320 indicating that the components constituting the card are all set in the prepressing step is displayed. For example, the group with the group ID "1" indicated by the card 1312 is constituted of front-cover component IDs "3000001" and "3000004". To avoid complexity hereinafter, a group with a group ID "k" (k being an integer) will be referred to as "group "k"". Since both of these two components have completely undergone the immediately-preceding creating process and are currently in the prepressing step, the card 1312 has the preparation-completed marks 1320 displayed therein. In the example in FIG. 5, a mouse-hover operation is performed on this card 1312 so that a tool tip 1330 displaying the component IDs "3000001" and "3000004" constituting the group "1" is displayed. Information about these two components (i.e., component ID values in the drawing) are displayed in a normal mode (e.g., in a dark color). This indicates that these two components are both in the prepressing step.

On the other hand, the card 1316 displays a waiting mark 1322 indicating that the components constituting the card includes a component that has not yet reached the prepressing step. The group "3" indicated by the card 1316 is constituted of component IDs "3000003" and "3000006" of postcards. Currently, the component "3000006" of these two components is in the prepressing step, but the component "3000003" is in the immediately-preceding creating step. This implies that not all of the two components are in the prepressing step. Therefore, the card 1316 has the waiting mark 1322 displayed therein.

The preparation-completed mark 1320 and the waiting mark 1322 are to be displayed with respect to the cards 1312, 1314, and 1316 that are located in the waiting region within the display region 1300. In order to transfer a certain card, such as the card 1312, from the waiting region to the in-progress region, the components constituting the card 1312 all have to be in the prepressing step. Thus, a waiting mark or a preparation-completed mark does not have to be displayed for the card 1312 when located in the in-progress region.

Figure 6:
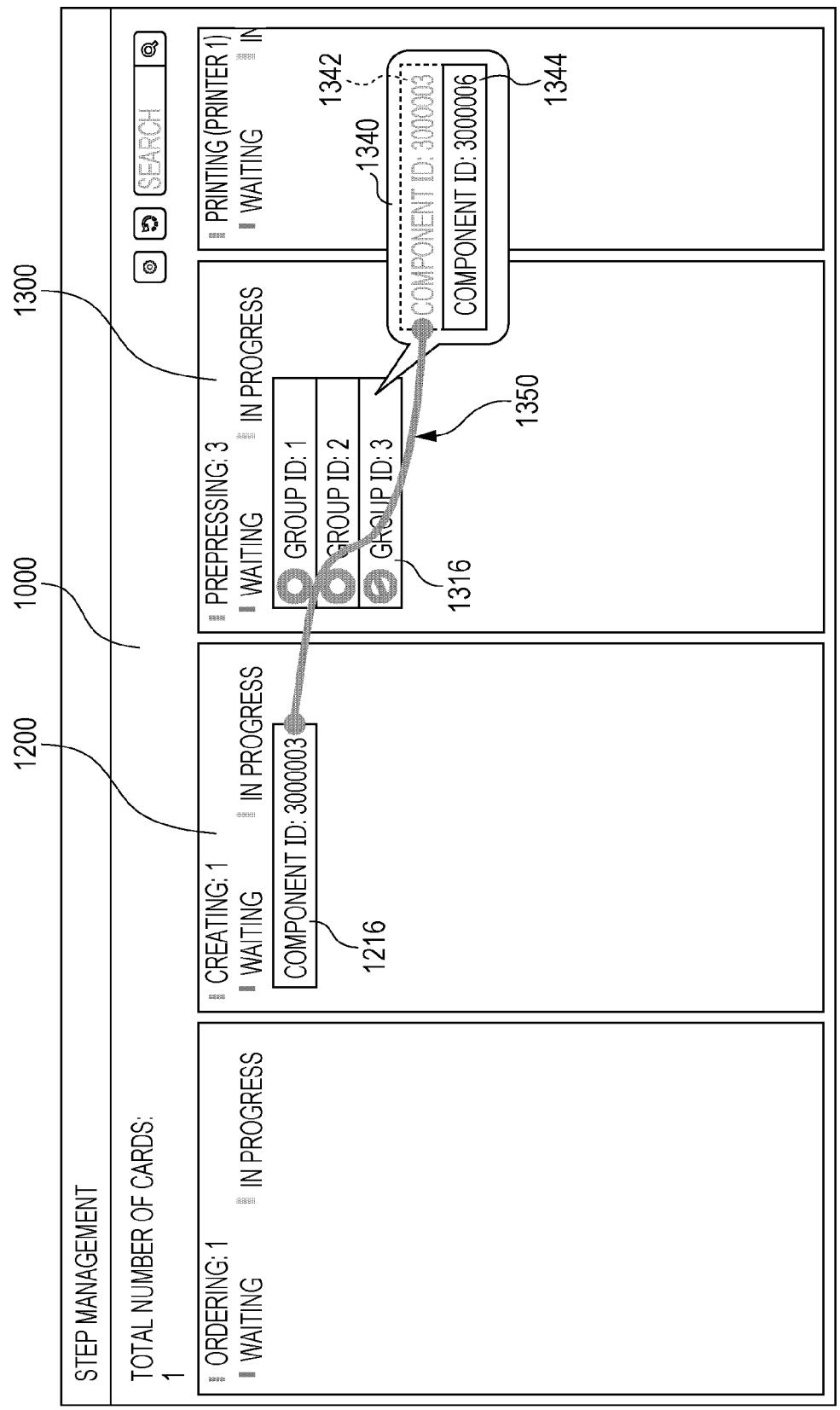
FIG. 6 illustrates another example of the progress screen showing the progress.

When a mouse-hover operation is performed on the card 1316, a tool tip 1340 shown in FIG. 6 is displayed. The tool tip 1340 displays icons 1342 and 1344 of the components "3000003" and "3000006" constituting the group "3". The icon 1344 with the corresponding component "3000006" in the prepressing step and information, such as the component ID therein, are displayed in a normal mode (e.g., as a text string in a dark color within a white rectangle). In contrast, the icon 1342 is displayed in a mode different from the normal mode and indicates that the corresponding component "3000003" has not reached the prepressing step. The display mode of the icon 1342 is merely an example and may be an indistinctive mode, such as a grayed-out mode, as compared with the normal mode. A component that has not yet reached a step of interest, that is, a component that is in a step preceding that step, will be referred to as an unreached-status component with respect to that step.

In the example in FIG. 6, a link line 1350 that links the icon 1342 of the unreached-status component "3000003" not having reached the prepressing step in the tool tip 1340 with the card 1216 including the relevant component currently in the creating step is displayed. In the shown example, the link line 1350 is a curved line that links the icon 1342 and the card 1216. Such a displayed linkage indicates that the unreached-status component "3000003" of the group "3" within the prepressing step is currently in the creating step. Accordingly, for example, the person in charge of the prepressing step is informed that the component "3000003" necessary for executing the group "3" is currently in the creating step, and may cope with the situation by, for example, inquiring the person in charge of the creating step about the current status of the component and the predicted date and time at which the creating step for the component may end. Moreover, the displayed linkage indicates that the unreached-status component "3000003" is being processed as a processing unit indicated by the card 1216 (or is waiting for the execution of the creating step) within the creating step. Accordingly, for example, the person in charge of the prepressing step may identify the processing unit in the creating step including the unreached-status component "3000003" and may inquire about the status related to the processing unit. For example, if the card 1216 serving as a linkage destination of the link line 1350 is currently undergoing the creating step, information (such as the name and ID number) about the person in charge of processing the card 1216 may be displayed in the vicinity of the card 1216.

Figure 7:
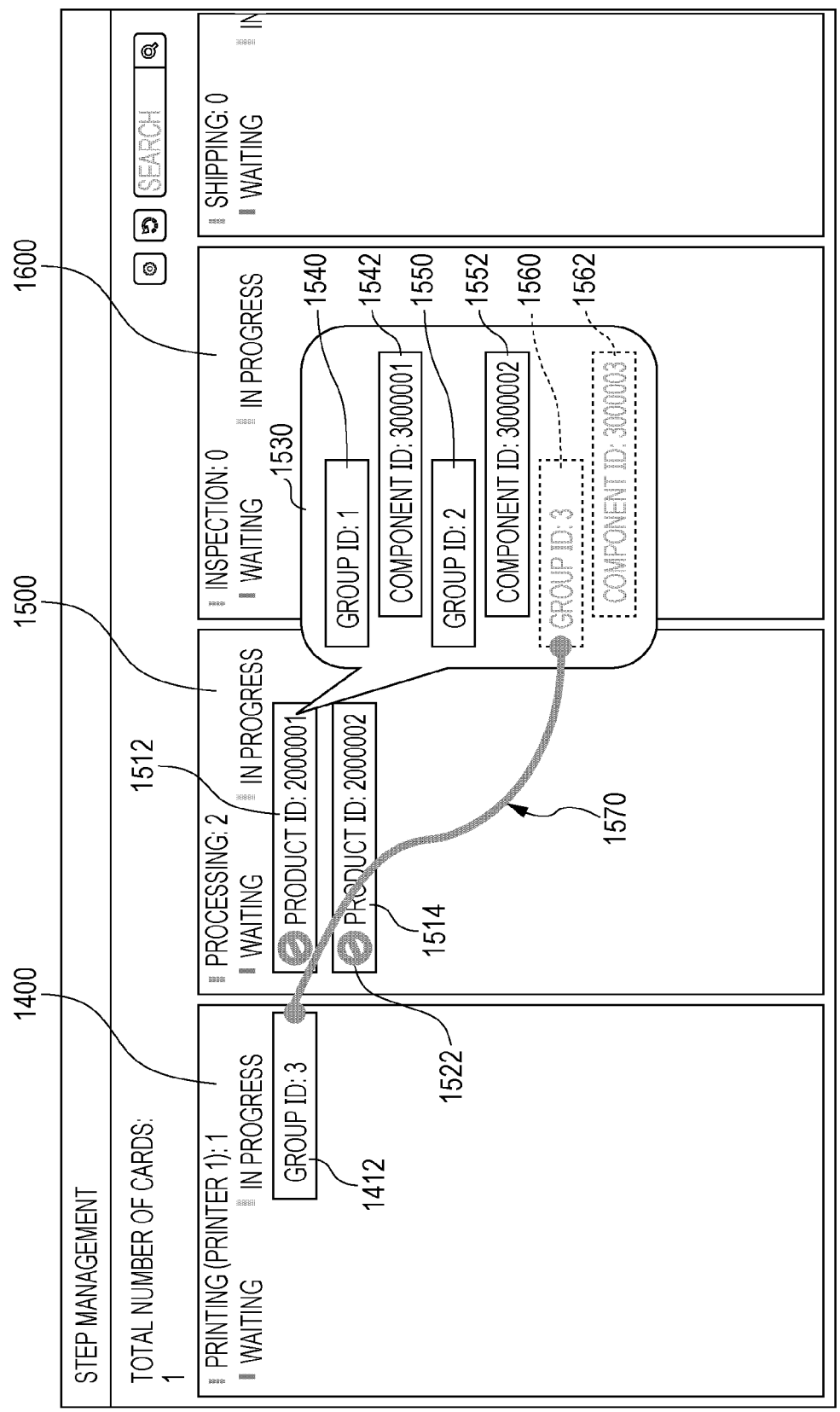
FIG. 7 illustrates another example of the progress screen showing the progress.

FIG. 7 illustrates display regions 1400, 1500, and 1600 for the printing step, the processing step, and the inspection step, respectively, on the progress screen 1000. The display region 1500 for the processing step in the progress screen 1000 shown in FIG. 7 displays two cards 1512 and 1514. A processing unit of the processing step is a product. The card 1512 indicates a product "2000001", and the card 1514 indicates a product "2000002". A waiting mark 1522 is displayed in each of the cards 1512 and 1514. A tool tip 1530 with respect to the card 1512 is displayed in response to a mouse-hover operation performed on the card 1512. The tool tip 1530 displays icons 1542, 1552, and 1562 respectively indicating components "3000001", "3000002", and "3000003" constituting the product "2000001". The tool tip 1530 also displays icons 1540, 1550, and 1560 indicating the processing units respectively including the components indicated by the icons 1542, 1552, and 1562 in the immediately-preceding step (i.e., the printing step) in a mode that expresses the correspondence relationship therebetween. In the shown example, the icons 1542, 1552, and 1562 of the components respectively included in the processing units in the immediately-preceding step are disposed respectively below the icons 1540, 1550, and 1560 of the processing units at positions displaced rightward by one level from the icon 1560 and so on of the processing units, thereby expressing the correspondence relationship between the processing units and the components. This expression mode is merely an example, and a different expression mode may be employed. The icon 1542 and so on indicating the components and the icons 1130 and 1140 indicating the processing units including the components in the immediately-preceding step may be differentiated from each other based on different display modes, such as different display colors or different display densities.

Because the components indicated by the icons 1542 and 1552 have already reached the processing step, these icons 1542 and 1552 and the icons 1540 and 1550 of the processing units corresponding to the icons 1542 and 1552 in the preceding step are displayed in a normal display mode. In contrast, the component indicated by the icon 1562 is currently in the printing step and has not reached the processing step. Thus, this icon 1562 and the icon 1560 of the processing unit corresponding to the icon 1562 in the printing step are displayed in a display mode that is different from the normal display mode and that indicates that the relevant component has not reached the processing step.

The progress screen 1000 also displays a link line 1570 that links the icon 1560 and a card 1412. As mentioned above, the icon 1560 indicates the processing unit, that is, the group, of the preceding step, that is, the printing step, including the icon 1562 indicating the unreached-status component within the display region 1500 for the processing step. The card 1412 indicates the processing unit including the component currently waiting to be processed or currently being processed in the printing step. Therefore, by tracing the link line 1570 from the unreached-status component in the processing step, the card currently in the printing step and including the unreached-status component is identified.

FIGS. 6 and 7 relate to examples where an unreached-status component within a card in a certain step is in a step immediately preceding the certain step. In contrast, FIG. 8 illustrates an example where an unreached-status component within a card in a certain step is in a step previous to the step immediately preceding the certain step.

Figure 8:
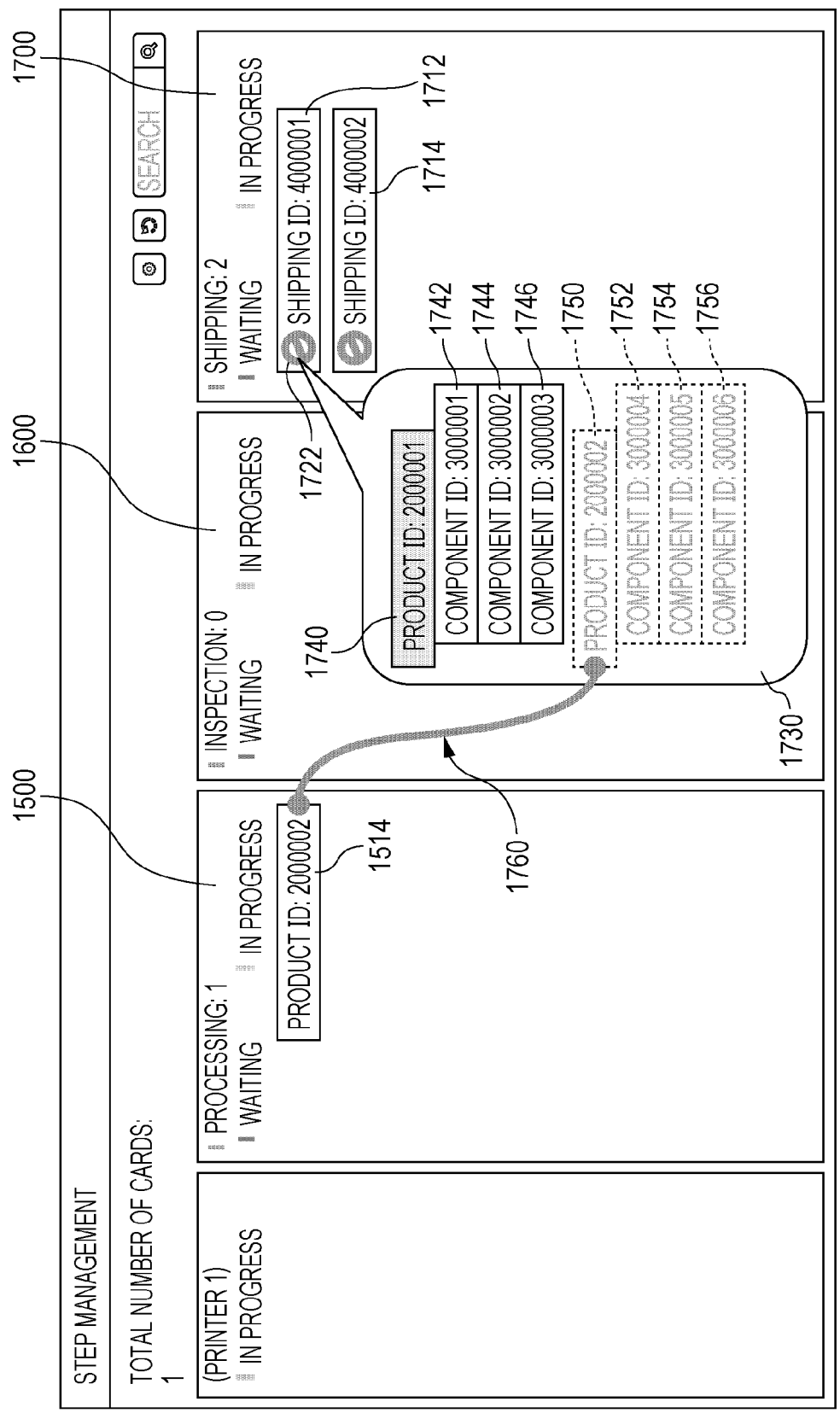
FIG. 8 illustrates another example of the progress screen showing the progress.

In the progress screen 1000 shown in FIG. 8, two cards 1712 and 1714 with waiting marks 1722 displayed therein are displayed in a display region 1700 for the shipping step. The cards 1712 and 1714 indicate processing units of the shipping step. For example, the card 1712 has a shipping ID "4000001" and indicates a processing unit of the shipping step. In the shown example, information about components constituting the card 1712 is displayed within a tool tip 1730. The tool tip 1730 displays icons 1740 and 1750 indicating the products "2000001" and "2000002", respectively. The tool tip 1730 also displays icons 1742 to 1746 and icons 1752 to 1756 of the components "3000001" to "3000003" and the components "3000004" to "3000006", respectively, constituting the products. Accordingly, the shipping process indicated by the shipping ID "4000001" involves shipping the two products to a designated delivery destination.

In the tool tip 1730, the product icon 1740 and the component icons 1742 to 1746 corresponding thereto are displayed in a normal display mode. This indicates that the product "2000001" has already undergone the printing step and the inspection step and has reached the shipping step. In contrast, the product icon 1750 and the component icons 1752 to 1756 corresponding thereto are displayed in a display mode that is different from the normal display mode and that indicates that there is an unreached-status component or components. In this example, the product "2000002" is currently undergoing the processing step and has not yet reached the shipping step.

The progress screen 1000 also displays a link line 1760 that links the icon 1750 of an unreached-status product with the card 1514 of the relevant product located in the in-progress region of the display region 1500 for the processing step. By tracing this link line 1760 from the icon 1750, the card 1514 indicating the current status of the product in the processing step is identified.

Accordingly, the link line 1760 may sometimes indicate a linkage between an icon and a card between non-adjacent steps.

Figure 9:
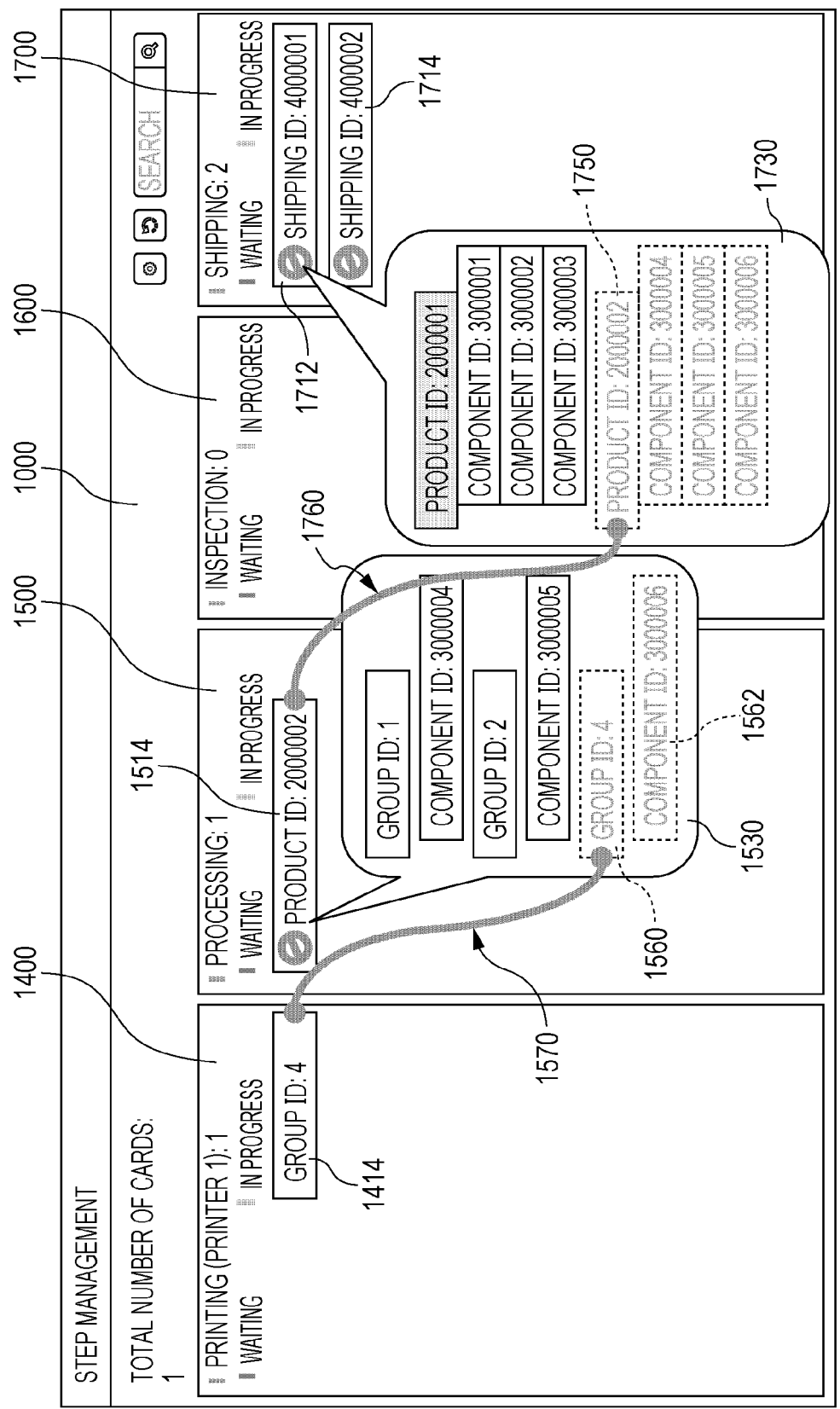
FIG. 9 illustrates another example of the progress screen showing the progress.

FIG. 9 illustrates an example where an unreached-status component in a step of interest is traced back in a chain-reaction-like fashion to a processing unit of a step that the component is currently in. In the example in FIG. 8, the product "2000002" as a shipping target of the shipping ID "4000001" is currently undergoing the processing step. In contrast, in the example in FIG. 9, the product "2000002" is waiting to be processed in the processing step, and the component "3000006" constituting the product is currently undergoing the printing step preceding the processing step. In the example shown in FIGS. 1 to 8, the components "3000003" and "3000006" belong to the same group "3". In contrast, in the example in FIG. 9, the component "3000003" belongs to the group "3", whereas the component "3000006" belongs to a different group "4".

The progress screen 1000 displays the link line 1760 that links the icon 1750 of the product "2000002" within the tool tip 1730 corresponding to the card 1712 in the shipping step with the card 1514 of the product "2000002" located in the waiting region of the processing step preceding the shipping step by two steps. Also displayed are the tool tip 1530 corresponding to the card 1514 in the processing step and the link line 1570 that links the icon 1560 of the group "4" within the tool tip 1530 and the card 1414 of the group "4" in the preceding printing step.

By tracing the link line 1760 from the icon 1750, it is identified that the card 1514 of the product indicated by the icon 1750 is located in the waiting region of the processing step. Moreover, by displaying the tool tip 1530 of the card 1514, it is indicated that the component "3000006" of the product indicated by the card 1514 has not reached the processing step. Then, by tracing the link line 1570 from the icon 1560 indicating the group including the component, it is identified that the card 1414 of that group is located in the in-progress region of the printing step. For example, a person in charge of the shipment of the shipping ID "4000001" may view this display so as to be informed that an unreached-status product is stopped at the processing step and that a component constituting the product is being processed in the printing step.

In the examples in FIGS. 6 to 9, the link lines 1350, 1570, and 1760 are each used to indicate a linkage between an icon corresponding to an unreached-status component within a tool tip and a card indicating a processing unit including the component in a step that the component is currently in. However, the display of such a linkage is merely an example. Alternatively, for example, the icon and the card may be displayed in the same display mode (but are distinguishable from other icons and cards), so that the icon and the card are indicated that they correspond with each other. The same display mode in this case may include various conceivable examples, such as the same display color and the same blinking pattern.

In order to provide the progress screen 1000 described above, the information processing apparatus stores and manages management information shown in each of FIGS. 10 to 14. The management information shown in each of FIGS. 10 to 14 is contained in the information processing apparatus as, for example, a relational database.

FIG. 10 illustrates order management information. As shown in FIG. 10, order management information includes information items, such as an order name, an order received time, a client name, and a client ID, in association with an order ID. An order ID is identification information added to an order from a client. An order name is a name added to the order. An order received time is the date and time at which the order is received. A client name is a name of a client (such as a corporation or an individual) serving as an orderer. A client ID is identification information added to the client.

FIG. 11 illustrates product management information. Each piece of product management information includes information items, such as an order ID, a product name, and the number of copies, in association with a product ID. A product ID is identification information added to a product to be manufactured in response to an order. Although merely an example, it is assumed that the product to be manufactured as a result of printing and bookbinding processes is a printed material (e.g., a catalog) in this example. An order ID is an order ID of an order including the product as a target. A product name is a name of the product. The number of copies is the number of copies of the product, that is, the printed material. In the example in FIG. 11, an order identified based on an order ID "1000001" demands that 100 copies be manufactured for each of two products identified based on product IDs "2000001" and "2000002".

FIG. 12 illustrates component management information. Each piece of component management information includes information items, such as a product ID, a group ID, a component name, and a sheet ID, in association with a component ID. A component ID is identification information added to a component.

A product ID is a product ID of a product including the component as an element. In the shown example, three components with component IDs "3000001", "3000002", and "3000003" constitute a product with a product ID "2000001". This corresponds to the above-described specific example shown in FIGS. 1 to 8.

A group ID is identification information of a group to which a component belongs. In the above-described specific example shown in FIGS. 1 to 8, there are three types of components, namely, a front cover, body text, and a postcard, and a group is formed for each component type. A group ID is added to each group constituted in this manner. Group IDs "1", "2", and "3" respectively correspond to a front-cover group, a body-text group, and an application-postcard group.

A component name is a name of a component. A component name may indicate a component type or may be independent of a component type.

A sheet ID is identification information of a sheet to be used in printing of a component, and indicates a sheet type. In the shown example, a sheet ID is designated for each group ID.

FIG. 13 illustrates shipping management information. Each piece of shipping management information includes information items, such as an order ID, a product ID, a deadline, the number of copies, and a shipping destination, in association with a shipping ID. A shipping ID is identification information added to a shipping process. An order ID is an order ID of an order corresponding to the shipping process. A product ID is a product ID of a product to be shipped in the shipping process. A deadline is a deadline by which the product is to be shipped to a shipping destination in the shipping process. The number of copies is the number of copies of the product indicated by the product ID in the shipping process. A shipping destination is a shipping destination in the shipping process. In the shown example, for example, in the shipping process for a shipping ID "4000001", 50 copies are to be shipped for each of products "2000001" and "2000002" to the same shipping destination, that is, Tokyo.

The values of the information items in each piece of management information shown in FIGS. 10 to 13 are input to a database in the ordering step (i.e., order-receiving step) based on data of the received order.

FIG. 14 illustrates progress management information. Each piece of progress management information shown indicates the progress of a workflow for each component. Each piece of progress management information includes a product ID item, a group ID item, a shipping ID item, an ordering-step item, a creating-step item, a prepressing-step item, a printing-step item, a processing-step item, an inspection-step item, and a shipping-step item in association with a component ID.

A component ID is identification information of a component. A product ID is identification information of a product to which the component belongs, a group ID is identification information of a group to which the component belongs, and a shipping ID is identification information of a shipping process to which the component belongs. Since it is possible to determine which product, group, and shipping process each component belongs to from other management information, such as component management information, the progress management information does not necessarily have to include the product ID item, the group ID item, and the shipping ID item, but includes these items here to enable better understanding by the reader.

The items from the ordering-step item to the shipping-step item each indicate the component status in the corresponding step of the workflow. These items are arranged sequentially from the left in accordance with the sequence of the steps in the workflow. The component status in each step includes four stages, namely, a "completed" status, an "in-progress" status, a "waiting" status, and a blank status.

The "completed" status is a status where the relevant step is completed. The "in-progress" status is a status where the relevant step is in progress. A card indicating a processing unit including a certain component in the "in-progress" status in a certain step is displayed in the in-progress region of the display region for the relevant step in the progress screen 1000. The "waiting" status is a status where the processing unit including the relevant component is waiting to be processed in the relevant step. A component in the "waiting" status in a certain step has reached the step (i.e., is in the step) but is waiting to be processed in the step due to, for example, another component in the processing unit not having reached the step yet. With regard to a step corresponding to the blank status, the relevant component has not yet reached the step.

At a stage where an order is received from a client, the status fields for all components with respect to the steps are blank. Then, starting from the first ordering step, the status progresses for each step in the following sequence: the "waiting" status, the "in-progress" status, and the "completed" status. When a component completely undergoes a certain step, the status of the component with respect to the step changes from the "in-progress" status to the "completed" status, and the status with respect to the subsequent step changes from blank to the "waiting" status. When a certain step starts on a processing unit including a component in the "waiting" status with respect to the step, the status of the component changes to the "in-progress" status.

The progress shown in FIG. 14 corresponds to the progress screen 1000 shown in FIGS. 5 and 6. In this example, only the component "3000003" among the components "3000001" to "3000006" is in the creating step, whereas the remaining five components are in the "waiting" status in the prepressing step.

FIG. 15 illustrates another example of progress management information. This example corresponds to the progress screen 1000 shown in FIG. 9.

The example shown in FIGS. 15 and 9 is similar to the example shown in FIGS. 10 to 13 except that the component "3000006" belongs to the group "4" instead of the group "3".

At the time point when the progress screen 1000 shown in FIG. 9 is displayed, the groups "1", "2", and "3" have completely undergone the printing step, whereas the group "4" is undergoing the printing step. Therefore, in the progress management information shown in FIG. 15, the components "3000001" to "3000005" belonging to the groups "1" to "3" are in the "completed" status with respect to the printing step, whereas the component "3000006" belonging to the group "4" is in the "in-progress" status with respect to the printing step.

At the time point when the progress screen 1000 shown in FIG. 9 is displayed, the product "2000001" constituted of the printed components "3000001", "3000002", and "3000003" has also completely undergone the processing step and the inspection step. Therefore, in the progress management information in FIG. 15, the components "3000001", "3000002", and "3000003" are in the "completed" status with respect to the processing step and the inspection step.

In contrast, of the components "3000004", "3000005", and "3000006" constituting the product "2000002", the first two components have completely undergone the printing step and have reached the processing step, whereas the last component "3000006" is still in the printing step. Therefore, the product "2000002" is in the waiting status at the processing step (see the card 1514 in FIG. 9). In the progress management information, the components "3000004" and "3000005" are in the "waiting" status with respect to the processing step, whereas the component "3000006" is still in the printing step, so that the status field thereof with respect to the processing step is blank.

The product "2000001" may undergo two shipping processes corresponding to the shipping IDs "4000001" and "4000002". These two shipping processes are both applicable to the products "2000001" and "2000002". The product "2000001" has already undergone the inspection step and has reached the shipping step, whereas the product "2000002" is still in the waiting status at the processing step and has not reached the shipping step. Therefore, the waiting region within the display region 1700 for the shipping step in the progress screen 1000 displays the two cards 1712 and 1714 corresponding to the shipping IDs "4000001" and "4000002". These two cards 1712 and 1714 have waiting marks displayed therein indicating that the components are deficient. In the progress management information, all the components "3000001" to "3000006" are in the "waiting" status with respect to the shipping step.

Next, an example of a processing procedure executed by the information processing apparatus for displaying the above-described progress screen 1000 will be described with reference to FIGS. 16 to 18.

FIG. 16 illustrates a basic processing procedure for transferring a card between steps. In this procedure, the information processing apparatus first determines in step S12 whether a processing unit indicated by, for example, the card 1112 in any one of the display regions 1100 to 1700 for the respective steps within the workflow has completely undergone the corresponding step. This determination may be performed based on an operation performed by the user or may be performed when, for example, a sensor detects that a device executing the step has completed the step. The determination based on an operation performed by the user involves, for example, determining that the step is completed when the user inputs an indication that the step is completed to the device executing the step. In another example, when the user transfers a card of a certain step (referred to as "current step" hereinafter) on the progress screen 1000 to the next step (referred to as "subsequent step" hereinafter) by, for example, a drag-and-drop operation, the information processing apparatus may determine that the current step is completed. The determination in step S12 is repeated, for example, on a regular basis until the determination result indicates "Yes". When the user transfers the card from a first step to a second step by a drag-and-drop operation, the information processing apparatus checks whether the second step is a step subsequent to the first step. If the second step is not a step subsequent to the first step, the information processing apparatus may prohibit the transfer of the card and, for example, return the card to the first step.

The card determined as having completed the current step in step S12 will be referred to as "current card" hereinafter.

If the determination result in step S12 indicates "Yes", the information processing apparatus acquires information about the current card having completed the current step in step S12 from a workflow database provided in the information processing apparatus in step S14. The information to be acquired in this case includes information about one or more components (such as information about the component configuration indicated in the tool tips 1120, 1330, and 1530) constituting the current card. Accordingly, the one or more components constituting the card are identified. Each of the individually identified components will be referred to as "component of interest". Then, in step S16, the information processing apparatus deletes the current card from the display region for the current step.

In step S18, the information processing apparatus acquires information about the component configuration of a card, that is, a processing unit, of the subsequent step. For example, if the subsequent step is a prepressing step, the processing unit is a "group" for each component type, as shown in FIG. 5. In this case, the information processing apparatus identifies a component group of the same type as information about the component configuration of the processing unit in the prepressing step. In more detail, the information processing apparatus refers to the component management information shown in FIG. 12 so as to identify the component configuration of each group, as in the group with the group ID "1" being constituted of the components "3000001" and "3000004" and the group with the group ID "2" being constituted of the components "3000002" and "3000005".

Step S14 to step S18 described above may be executed in any sequence.

Subsequently, in step S20, the information processing apparatus generates a subsequent-step card including a component, that is, a component of interest, constituting the current card. This card is generated based on the information acquired in step S14 and step S18. Specifically, step S20 involves identifying, for each component of interest, a subsequent-step card including the component of interest as an element, and generating the card. Therefore, in step S20, there may be a case where multiple subsequent-step cards are generated.

If a subsequent-step card including a component of interest is already displayed in the display region for the subsequent step, the same card is not to be generated in step S20. Instead, the component of interest becomes an element of the already-displayed subsequent-step card in step S20.

A subsequent-step card generated in step S20 and an already-existing subsequent-step card with a component of interest as an element in step S20 will each be referred to as "subsequent card" hereinafter.

Subsequently, the information processing apparatus executes step S22 to step S28 for each subsequent card. Specifically, with regard to a certain subsequent card, the information processing apparatus determines in step S22 whether the components constituting the card are all set in the subsequent step. If the determination result in step S22 indicates "Yes", that is, if it is determined that the components constituting the card are all set in the subsequent step, the information processing apparatus generates a subsequent-card image including a preparation-completed mark (such as the preparation-completed mark 1320 in FIG. 5) in step S24. If the determination result in step S22 indicates "No", the information processing apparatus generates a subsequent-card image including a waiting mark (such as the waiting mark 1322 in FIG. 5) in step S26. Then, the information processing apparatus displays the subsequent-card image generated in step S24 or step S26 in the waiting region for the subsequent step in step S28. If a subsequent card is already displayed in the display region for the subsequent step at the time point when step S20 is executed, the information processing apparatus performs the determination in step S22 with respect to a displayed card subsequent thereto. Then, based on the determination result, the preparation-completed mark displayed in that subsequent card is changed to the waiting mark, where appropriate.

A specific example of the process in step S16 will now be described. In the example shown in FIGS. 1 to 9, for example, when the card with the group ID "1" in the printing step is completely processed, the components "3000001" and "3000004" (see FIG. 12) constituting the card are identified in step S14. At this time point, it is assumed that the cards with the group IDs "2" and "3" have not completely undergone the printing step. In step S18, cards, that is, processing units, to undergo the subsequent processing step are "products". It is clear in step S18 that, of these products, the product "2000001" includes the component "3000001" and the product "2000002" includes the component "3000004". Therefore, in step S20, two cards for the products "2000001" and "2000002" are generated within the processing step. At this time point, for example, the card for the product "2000001" within the processing step includes the component "3000001" among the constituent components, but does not yet include the remaining two components "3000002" and "3000003". Therefore, the determination result in step S22 indicates "No", and the card for the product "2000001" within the processing step is given a waiting mark in step S26. Then, this card given the waiting mark is displayed in the waiting region within the display region 1500 for the processing step in step S28.

Furthermore, for example, the card for the product "2000001" may already exist within the processing step at the time point when the card for the group ID "1" has completely undergone the printing step. In this case, the card for the product "2000001" is not to be generated again in step S20. Instead, the component "3000001" of the card for the group ID "1" becomes a component of the card for the product "2000001". Then, it is determined in step S22 whether the components of the card for the product "2000001" are all set in the processing step. If the determination result indicates "Yes", the mark added to that card is changed from a waiting mark to a preparation-completed mark in step S24, and the change is reflected on the display of the card in step S28.

Figure 17:
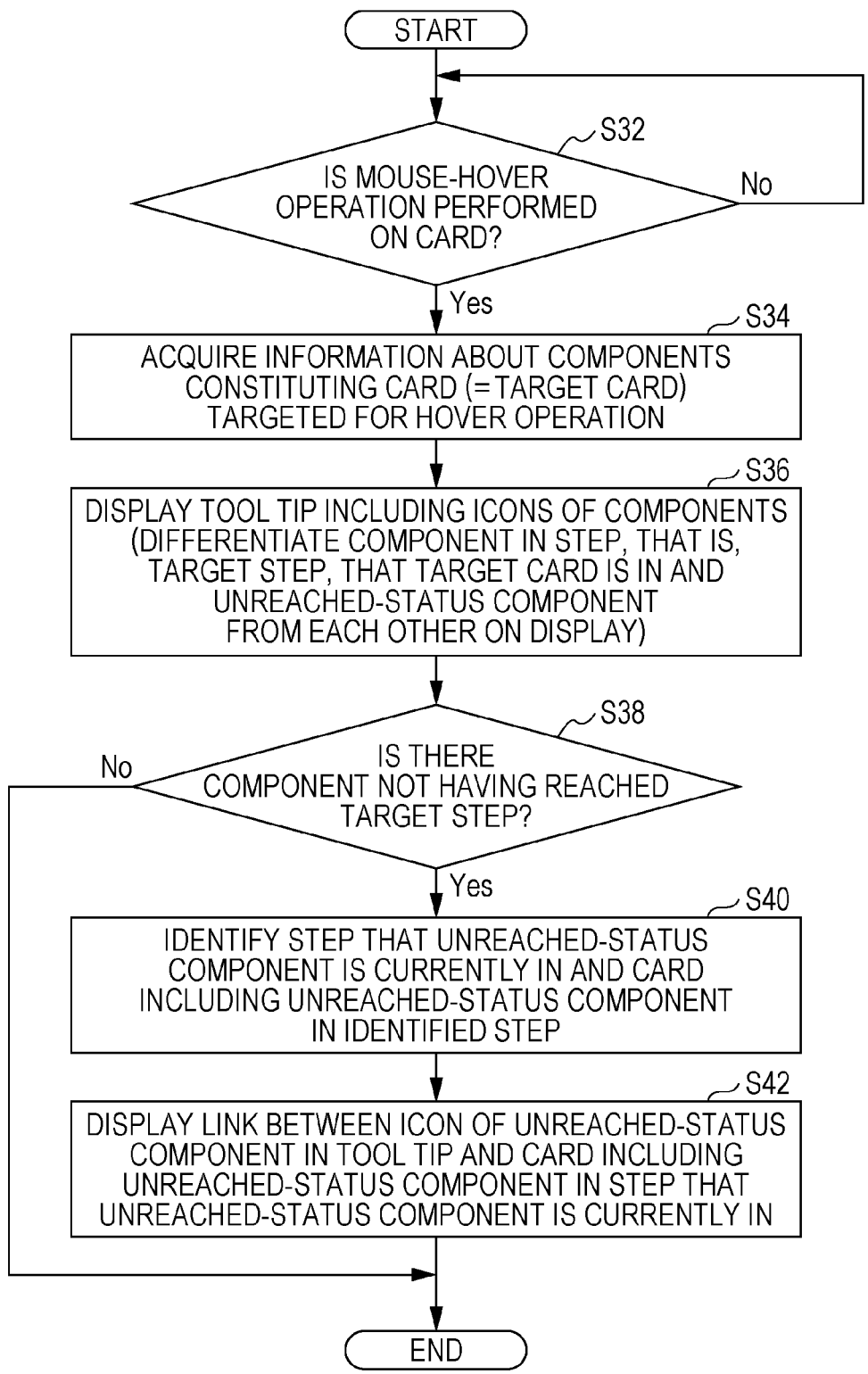
FIG. 17 illustrates a processing procedure for displaying a tool tip with respect to a card.
Figure 18:
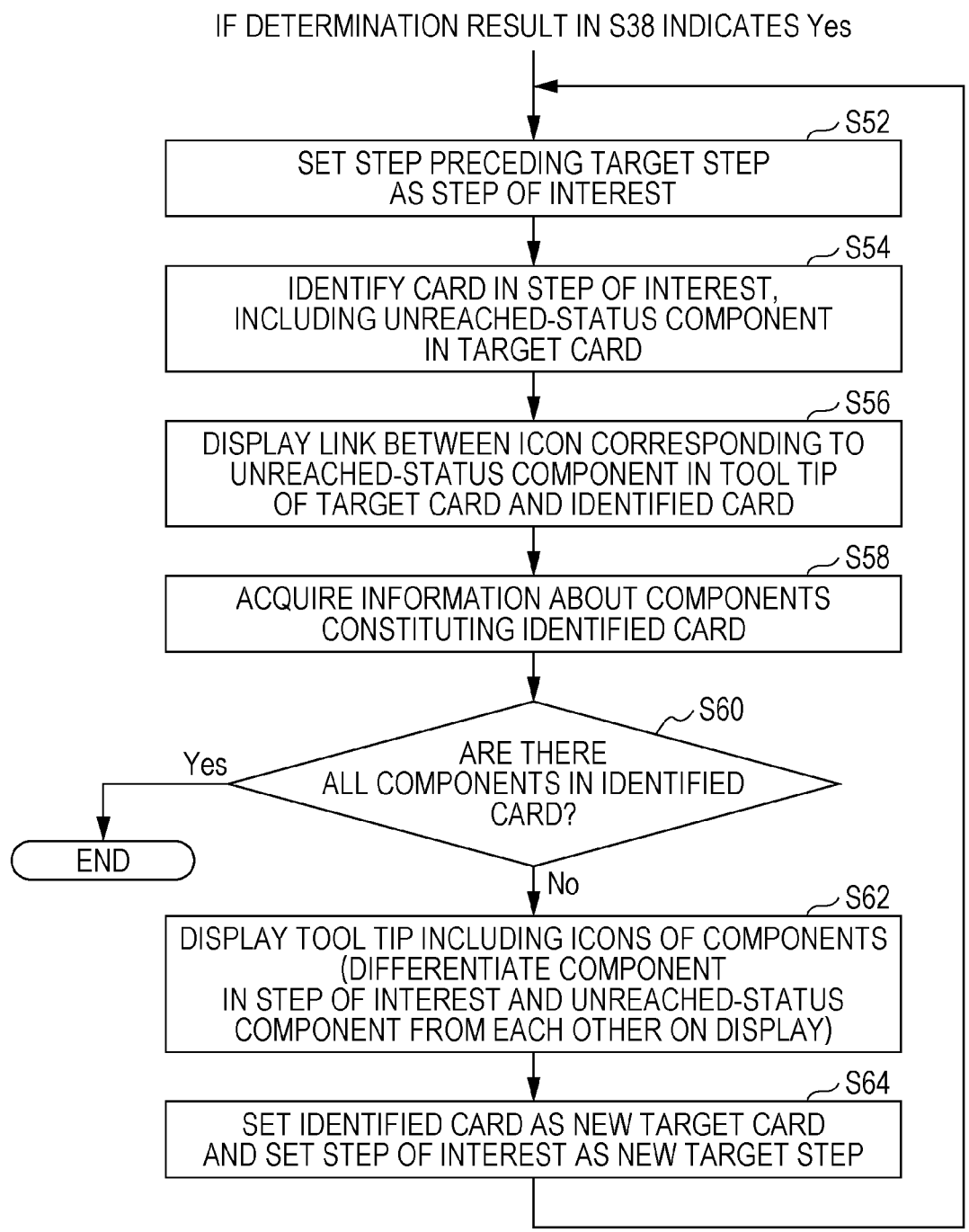
FIG. 18 illustrates a processing procedure for displaying a tool tip with respect to a card.

The following description with reference to FIG. 17 relates to an example of a processing procedure for displaying tool tips with respect to the card 1110 and so on displayed in the display regions 1100 to 1700.

In this procedure, the information processing apparatus monitors whether a mouse-hover operation is performed on a card in any of the display regions 1100 to 1700 in step S32. When a mouse-hover operation performed on a card is detected (Yes in step S32), the information processing apparatus acquires information about one or more components constituting the card from the component management information (see FIG. 12) in the database in step S34. In the following description, a card targeted for a mouse-hover operation will be referred to as "target card", and a step in which the card is located will be referred to as "target step".

In step S36, the information processing apparatus displays the tool tip 1120 displaying icons indicating components in the target card on the progress screen 1000. In this case, the information processing apparatus determines whether each of the components constituting the target card has reached the target step based on the progress management information (see FIG. 14). Then, an icon indicating a component that has reached the target step and an icon indicating a component that has not reached the target step are arranged and displayed within a tool tip (e.g., see the tool tip 1340 in FIG. 6) in different display modes corresponding to the reached status and the unreached status. Moreover, the information processing apparatus may associate an icon indicating a processing unit including the components in a step immediately preceding the target step with the component icons and display the icons in a tool tip (e.g., see the tool tip 1530 in FIG. 7).

Then, in step S38, the information processing apparatus determines whether the components constituting the target card includes a component that has not reached the target step. If the determination result indicates "Yes", that is, if there is an unreached-status component, the information processing apparatus refers to the progress management information to identify a step that the unreached-status component is currently in and a card that includes the unreached-status component in the identified step in step S40. Step S40 involves, for example, searching through the progress management information using the component ID of the unreached-status component as a key, so as to identify a step in which the component is located in the "waiting" status or the "in-progress" status. Moreover, step S40 also involves identifying the type of cards, that is, processing units, of the identified step and identifying a card including the unreached-status component from among the cards corresponding to the type.

In step S42, the information processing apparatus displays a link expressing a linkage between the icon indicating the unreached-status component within the tool tip and the card including the unreached-status component in the step, identified in step S40, that the unreached-status component is currently in.

If the determination result in step S38 indicates "No", that is, if the components in the target card have all reached the target step, the information processing apparatus skips step S40 and step S42.

The following description relates to the procedure in FIG. 17 with reference the progress screen 1000 shown in FIG. 6 as an example. In this example, a mouse-hover operation performed on the card 1316 in the display region 1300 for the prepressing step is detected (Yes in step S32). Then, the information processing apparatus determines in step S34 that the group "3" indicated by the card 1316 includes the components "3000003" and "3000006" based on the component management information. Furthermore, the information processing apparatus ascertains from the progress management information (see FIG. 14) that the component "3000006" is in the prepressing step but the component "3000003" has not reached the prepressing step and is in the preceding creating step. In step S36, the information processing apparatus displays the icon 1342 indicating the component "3000003" in the unreached-status display mode and the icon 1344 indicating the component "3000006" in the reached-status display mode within the tool tip 1340 corresponding to the card 1316. In this example, the determination result in step S38 indicates "Yes" due to the unreached-status component "3000003". The information processing apparatus checks the progress management information in FIG. 14 to recognize that the unreached-status component "3000003" is currently in the creating step in step S40. Moreover, since a processing unit in the creating step is a component, the information processing apparatus identifies the card 1216 indicating the processing unit including the component "3000003", that is, the component "3000003" itself, in the display region 1200 for the creating step in step S40. Then, in step S42, the information processing apparatus displays the link line 1350 indicating a linkage between the icon 1342 indicating the unreached-status component within the tool tip 1340 and the card 1216 in the creating step.

Furthermore, as shown in FIG. 7, the icons 1540, 1550, and 1560 for the processing units including the components in the preceding step are sometimes respectively displayed in correspondence with the component icons 1542, 1552, and 1562 within the tool tip 1530 for the target step. In such an example, the link line 1570 that links the icon 1560, in place of the icon 1562 of the unreached-status component, and the card 1412 may be displayed in step S42. Specifically, the icon 1560 indicates the processing unit including the unreached-status component in the preceding step, and the card 1412 includes the unreached-status component and is displayed in the display region 1400 for the preceding step.

Next, a processing procedure for displaying the chain-reaction-like link shown in FIG. 9 will be described with reference to FIG. 18. The procedure shown in FIG. 18 substitutes for step S40 and step S42 in the procedure in FIG. 17. If the determination result in step S38 in the procedure in FIG. 17 indicates "Yes", the information processing apparatus sets the step immediately preceding the target step as a step of interest in step S52, as shown in FIG. 18. In step S54, the information processing apparatus identifies the card 1514 in the step of interest, including the component not having reached the target step, within the target card 1712. Then, in step S56, the information processing apparatus displays the link line 1760 indicating a linkage between the icon corresponding to the component not having reached the target step and included within the tool tip 1730 displayed in correspondence with the target card 1712 in step S36 and the card identified in step S54. In one example, the icon corresponding to the component not having reached the target step and included within the tool tip is an icon indicating the component itself (see FIG. 6). In another example, the icon corresponding to the component not having reached the target step and included within the tool tip is an icon indicating the processing unit including the component in the target step (see FIG. 7). The icon corresponding to the component not having reached the target step is an example of an image indicating an unreached-status component within a display region corresponding to a target step.

In step S58, the information processing apparatus acquires information about one or more components constituting the card 1514 identified in step S54 from the component management information. Furthermore, in step S60, the information processing apparatus refers to the progress management information (see FIG. 15) to determine whether each of the components constituting the card 1514 has reached or not reached the step of interest, and to determine whether or not the components constituting the card 1514 have all reached the step of interest. A situation where a "component has reached the step of interest" includes a case where the component has already undergone the step of interest and is in a subsequent target step. If it is determined in step S60 that the components have all reached the step of interest, the information processing apparatus ends the process in FIG. 18. In the example in FIG. 15, since it is clear from the progress management information in FIG. 15 that the component "3000006" within the card 1514 has not reached the processing step, the determination result in step S60 indicates "No".

If it is determined in step S60 that there is a component not having reached the step of interest, the information processing apparatus proceeds to step S62 to display the tool tip 1530 corresponding to the card 1514 identified in step S54. In this tool tip 1530, the icon 1560 and so on indicating the processing units including the components constituting the card 1514 in a step immediately preceding the step of interest are displayed in correspondence with the icon 1562 and so on indicating the respective components. In this case, an icon indicating a component that has reached the step of interest and the icon 1562 indicating a component not having reached the step of interest are arranged and displayed within the tool tip in different display modes corresponding to the reached status and the unreached status (e.g., see the tool tip 1530 in FIG. 9).

Then, the information processing apparatus sets the card 1514 identified in step S54 as a new target card and sets the current step of interest as a new target step in step S64, and returns to step S52. Subsequently, the procedure in FIG. 18 is executed on the new target card and the new target step. Accordingly, in step S54, the link line 1570 that links the icon 1560 of the group "4" including the unreached-status component "3000006" within the tool tip 1530 and the card 1414 indicating the group "4" within the printing step as the step of interest is displayed. In the example in FIG. 9, since the printing step is being executed on the group "4", the components constituting the group "4" are all in the printing step. Therefore, the determination result in step S60 indicates "Yes", so that a chain reaction of the link line tracing back to a step preceding the current step does not occur.

In the progress screen 1000 shown in FIG. 9, the inspection step preceding the shipping step and the processing step preceding the inspection step both have a product or products as a processing unit or units. In this example, if a component that has not reached the shipping step is currently in a step preceding the processing step, an icon corresponding to the unreached-status component displayed in a tool tip for the shipping step is linked with a card of a product located in the preceding inspection step by a link line in the procedure in FIG. 18. Because the component in that product card has not reached the inspection step, an icon of the same component within a tool tip of that product card in the inspection step is linked with a card indicating the same product within the immediately-preceding processing step by a link line. Moreover, because the component in the product card in the processing step has not reached the processing step, an icon of the same component within a tool tip of that product card in the processing step is linked with a card including the component within a further preceding step by a link line. Accordingly, since the type of processing unit is the same between the inspection step and the processing step, a link line links an icon of the same component with a card of the same processing unit between the shipping step and the inspection step as well as between the inspection step and the processing step. However, such a repetition of the same structure leads to a complex appearance. In order to avoid such a complex appearance, the repetition of a link line from an icon of the same component to the same card between multiple steps is omitted in the repetition of the loop from step S52 to step S64 in FIG. 18. Instead, the link line 1760 that directly links the icon 1750 of the first component of the repetition with the last card 1514 of the repetition is displayed on the progress screen 1000.

Figure 19:
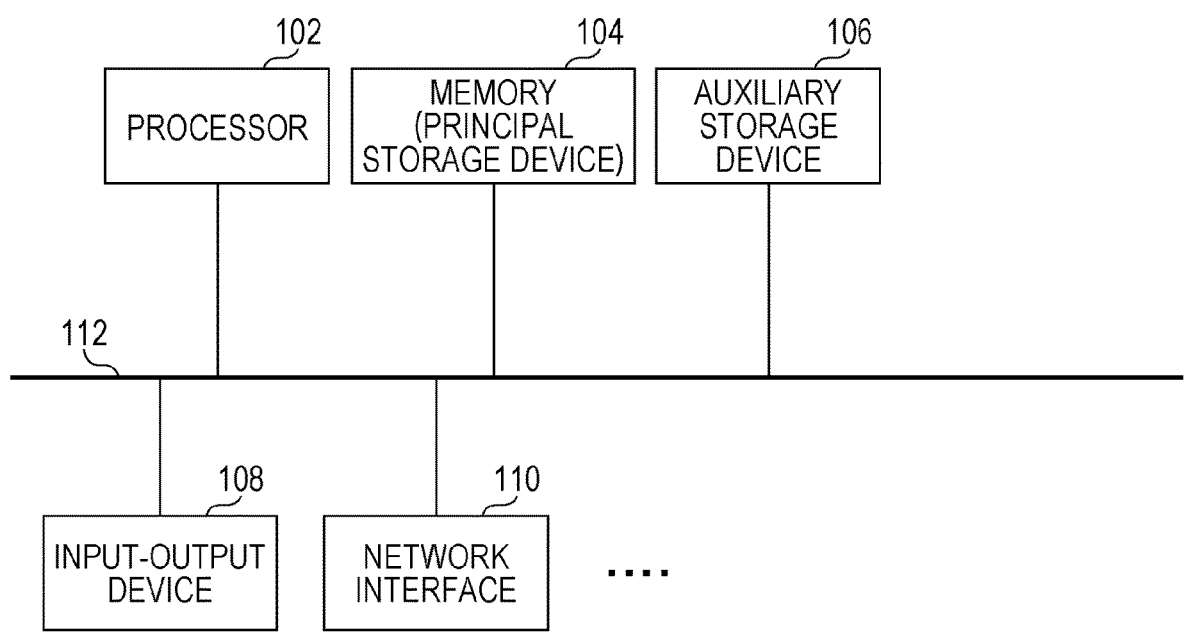
FIG. 19 illustrates an example of a hardware configuration of a computer serving as a base for the information processing apparatus.

The information processing apparatus described above is constituted by using, for example, a general-purpose computer. As shown in FIG. 19, the computer serving as a base for the information processing apparatus has a circuit configuration in which a processor 102, a memory (i.e., a principal storage device) 104, such as a random access memory (RAM), a controller for controlling an auxiliary storage device 106 serving as a nonvolatile storage device, such as a flash memory, a solid state drive (SSD), or a hard disk drive (HDD), an interface for various types of input-output devices 108, and a network interface 110 for performing control for connecting to a network, such as a local area network, are connected by a data transmission path, such as a bus 112. A program describing the contents of the process according to the above exemplary embodiment is installed in this computer via, for example, the network and is stored in the auxiliary storage device 106. The processor 102 executes the program stored in the auxiliary storage device 106 by using the memory 104, thereby realizing the information processing apparatus according to the above exemplary embodiment. The database storing the various types of management information shown in FIGS. 10 to 15 is constructed within, for example, the auxiliary storage device 106. In another example, the database may be provided in a network outside the information processing apparatus, and the information processing apparatus may read and write information from and onto the database via the network through the network interface 110.

In the exemplary embodiment above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiment above, the term "processor" is broad enough to encompass one processor or plural processors in collaboration which are located physically apart from each other but may work cooperatively. The order of operations of the processor is not limited to one described in the exemplary embodiment above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire information indicating one or more components constituting a processing unit to be processed in each of steps within a workflow, the information being acquired for each step; and
execute first display control for displaying a processing-unit image in a display region corresponding to a first step within the workflow in a case where at least one of one or more components constituting the processing unit to be processed in the first step is in the first step, the processing-unit image indicating the processing unit to be processed in the first step, the display region being provided within a screen indicating progress of the workflow, the one or more components constituting the processing unit to be processed in the first step being identified based on the information, wherein the first display control does not display the processing unit image in the display region corresponding to the first step within the workflow in a case where no component constituting the processing unit to be processed in the first step is the first step.

2. The information processing apparatus according to claim 1, wherein the processor is configured to further execute second display control for displaying information indicating a second step that an unreached-status component is currently in, the unreached-status component being included in the one or more components constituting the processing unit to be processed in the first step and being a component not having reached the first step and being in a step preceding the first step.

3. The information processing apparatus according to claim 2, wherein the second display control includes displaying information indicating the processing unit including the unreached-status component in the second step.

4. The information processing apparatus according to claim 3, wherein the second display control includes further displaying information indicating the processing unit including the unreached-status component in at least one step between the first step and the second step.

5. The information processing apparatus according to claim 3, wherein the second display control includes displaying the processing-unit image indicating the processing unit including the unreached-status component within the display region corresponding to the second step in correspondence with an image indicating the unreached-status component in the display region corresponding to the first step.

6. The information processing apparatus according to claim 5, wherein the second display control includes displaying the processing-unit image indicating the processing unit including the unreached-status component in at least one step between the first step and the second step in correspondence with an image indicating the unreached-status component in the display region corresponding to a step subsequent to the at least one step, the processing-unit image being displayed in the display region corresponding to the at least one step.

7. The information processing apparatus according to claim 1, wherein the first display control includes displaying a first type of processing unit and a second type of processing unit in different display modes, the first type of processing unit and the second type of processing unit being included in the processing unit to be processed in the first step, the first type of processing unit being a processing unit in which the one or more components constituting the processing unit are all in the first step, the second type of processing unit being a processing unit in which the one or more components constituting the processing unit include a component in a step preceding the first step.

8. The information processing apparatus according to claim 1, wherein the processor is configured to further execute third display control for displaying a component image indicating at least one component constituting the processing unit corresponding to the processing-unit image in correspondence with the processing-unit image within the display region.

9. The information processing apparatus according to claim 8, wherein the third display control includes displaying the component image indicating the at least one component constituting the processing unit in correspondence with information indicating a processing unit constituted by the at least one component in a step immediately preceding the first step.

10. The information processing apparatus according to claim 1, wherein, in a case where an input indicating completion of a process performed on the processing unit in a step immediately preceding the first step within the workflow is received, the first display control includes newly displaying, in the display region corresponding to the first step, the processing-unit image previously not displayed in the display region, the processing-unit image corresponding to the processing unit in the first step including the one or more components constituting the processing unit.

11. The information processing apparatus according to claim 10,
wherein the first display control includes:
displaying the processing-unit image in a first display mode if the processing unit to be processed in the first step has a component in a step preceding the first step in the one or more components constituting the processing unit; and
changing the display mode of the processing-unit image from the first display mode to a second display mode in a case where the input indicating the completion of the process performed on the processing unit in the immediately-preceding step is received, the display mode being changed for a processing unit that is included in the processing unit in the first step and in which components constituting the processing unit are all in the first step for a first time as a result of the completion.

12. A non-transitory computer readable medium storing a program causing a computer to execute a process, the process comprising:
acquiring information indicating one or more components constituting a processing unit to be processed in each of steps within a workflow, the information being acquired for each step; and
executing first display control for displaying a processing-unit image in a display region corresponding to a first step within the workflow in a case where at least one of one or more components constituting the processing unit to be processed in the first step is in the first step, the processing-unit image indicating the processing unit to be processed in the first step, the display region being provided within a screen indicating progress of the workflow, the one or more components constituting the processing unit to be processed in the first step being identified based on the information, wherein the first display control does not display the processing unit image in the display region corresponding to the first step within the workflow in a case where no component constituting the processing unit to be processed in the first step is the first step.

13. An information processing apparatus comprising:
acquiring means for acquiring information indicating one or more components constituting a processing unit to be processed in each of steps within a workflow, the information being acquired for each step; and
executing means for executing first display control for displaying a processing-unit image in a display region corresponding to a first step within the workflow in a case where at least one of one or more components constituting the processing unit to be processed in the first step is in the first step, the processing-unit image indicating the processing unit to be processed in the first step, the display region being provided within a screen indicating progress of the workflow, the one or more components constituting the processing unit to be processed in the first step being identified based on the information, wherein the first display control does not display the processing unit image in the display region corresponding to the first step within the workflow in a case where no component constituting the processing unit to be processed in the first step is the first step.

* * * * *